US012628788B2

(12) United States Patent
Dessing et al.

(10) Patent No.: US 12,628,788 B2
(45) Date of Patent: May 19, 2026

(54) MILK SAMPLING DEVICE, AND MILKING SYSTEM THEREWITH

(71) Applicant: LELY PATENT N.V., Maassluis (NL)

(72) Inventors: Jacobus Petrus Maria Dessing, Haarlemmermeer (NL); Michiel Adriaan Van Dorp, Hazerswoude-Rijndijk (NL); Pieter Gerlof De Groot, Giessenburg (NL); Nicolaas Maria Jozef Stoffels, Wassenaar (NL)

(73) Assignee: LELY PATENT N.V., Maassluis (NL)

( * ) Notice: Subject to any disclaimer, the term of this patent is extended or adjusted under 35 U.S.C. 154(b) by 219 days.

(21) Appl. No.: 18/551,070

(22) PCT Filed: Mar. 17, 2022

(86) PCT No.: PCT/IB2022/052445
§ 371 (c)(1),
(2) Date: Sep. 18, 2023

(87) PCT Pub. No.: WO2022/200946
PCT Pub. Date: Sep. 29, 2022

(65) Prior Publication Data
US 2024/0156043 A1 May 16, 2024

(30) Foreign Application Priority Data
Mar. 23, 2021 (NL) ..................................... 2027809

(51) Int. Cl.
*A01J 5/04* (2006.01)
*A01J 5/01* (2006.01)
(Continued)

(52) U.S. Cl.
CPC . *A01J 5/01* (2013.01); *A01J 9/00* (2013.01); *G01N 1/2035* (2013.01); *G01N 2001/1031* (2013.01); *G01N 2001/205* (2013.01)

(58) Field of Classification Search
CPC ...... A01J 5/01; A01J 9/00; A01J 5/045; A01J 5/00; G01N 1/2035; G01N 2001/1031; G01N 2001/205
(Continued)

(56) References Cited

U.S. PATENT DOCUMENTS 5,645,012 A    7/1997   Hoefelmayr

FOREIGN PATENT DOCUMENTS

CA        3111496 A1 *   4/2020   ............ A01J 5/0131
CN    102281757 B  *   5/2013   ............ G01F 11/284
(Continued)

OTHER PUBLICATIONS

International Search Report Issued Sep. 9, 2022, in PCT/IB2022/052445, filed on Mar. 17, 2022, citing documents 15-16 therein, 3 pages.

(Continued)

*Primary Examiner* — Robert R Raevis
(74) *Attorney, Agent, or Firm* — Oblon, McClelland, Maier & Neustadt, L.L.P.

(57) ABSTRACT

A sampling device for taking a representative milk sample from a milking device. The milking device includes a milking means, a milk jar, a milk hose, a milk tank, a milk line, a milk pump for pumping the milk, a milk meter for determining the quantity of milk milked, and a control unit. The sampling device includes a sample line with an input connection to the milk jar, the milk pump or the milk line, an output to a sample collection receptacle, and a control device controllable by the control unit based on the quantity of milk determined by the milk meter in order to direct, (Continued)

during pumping, a sample quantity of milk through the sample line. The control unit knows how much milk must be pumped and can take precisely enough milk samples distributed over the pumping operation such that an accurate representative sample is obtained.

19 Claims, 1 Drawing Sheet

(51) Int. Cl.
| | |
|---|---|
| *A01J 9/00* | (2006.01) |
| *G01N 1/20* | (2006.01) |
| *G01N 1/10* | (2006.01) |

(58) Field of Classification Search
USPC ...... 73/863, 863.02, 863.03, 863.83, 863.86, 73/864.33, 864.34; 119/14.08, 119/14.14–14.18
See application file for complete search history.

(56) References Cited

FOREIGN PATENT DOCUMENTS

| | | | | |
|---|---|---|---|---|
| DE | 32 10 465 A1 | | 9/1983 | |
| JP | H07167755 A | * | 7/1995 | ............... G01N 1/10 |
| WO | WO-9312413 A1 | * | 6/1993 | ............ G01F 1/588 |
| WO | WO 95/23959 A1 | | 9/1995 | |
| WO | WO2013115641 A1 | | 1/2013 | |
| WO | WO-2019034443 A1 | * | 2/2019 | .......... G01N 1/2035 |
| WO | WO-2020085979 A1 | * | 4/2020 | ............. A01J 5/045 |

OTHER PUBLICATIONS

Office Action issued on Jun. 28, 2025 in corresponding Chinese Application No. 202280019434.9, citing references 1 and 15 therein (with English translation), 12 pages.

* cited by examiner

MILK SAMPLING DEVICE, AND MILKING SYSTEM THEREWITH

This application is a 371 application of PCT/IB2022/052445 filed Mar. 17, 2022, and claims benefit of NL 2027809, filed Mar. 23, 2021. The contents of each of these applications are incorporated herein by reference.

In a first aspect, the present invention relates to a sampling device for taking a representative milk sample from a milking device, in particular a robotic milking device, which milking device comprises milking means, a milk tank for storing milk from a plurality of milkings, a milk line between the milking device and the milk tank, and a control unit for controlling the robotic milking device, the sampling device comprising a sample line with an input connection to the milk line, and with an output to a sample collection receptacle, which sampling device is configured to pump a sample quantity of milk through the sample line.

Such sampling devices are known per se. They are used to take a milk sample for examination in a laboratory, for example. It is important in this case to obtain as good a representation of the milk as possible. However, milk is a composite liquid, which does not have to have the same composition throughout the taken volume. A clear example is the milk fat, which is lighter than the aqueous constituents, and thus after a certain amount of time floats to the top ("skimming"). For this and other reasons, a proportional sample is taken.

For example WO95/23959A1 describes a proportional liquid sampler for taking milk samples for examination in a laboratory, wherein a separate peristaltic sample pump takes a partial milk flow from a milk flow during milking. In this case, the pumping speed of the sample pump is continuously controlled and adjusted on the basis of the continuously measured flow rate of the milk flow and the volume of milk to be pumped, which is estimated prior to the milking. This volume is estimated on the basis of historical milk data.

In practice, it is by no means always ensured that this sampling device yields an exact, preferably constant, at least predictable, sample quantity of milk, which is undesirable. After all, a too large quantity means unnecessary product loss, while a too small quantity may lead to inaccurate analysis results.

It is therefore also an object of the present invention to provide an improved sampling device that does not exhibit said drawback, or at least much less so.

To this end, the invention provides a sampling device as claimed in claim 1, in particular a sampling device for taking a representative milk sample from a milking device, in particular a robotic milking device, which milking device comprises milking means, a milk hose between the milking means and the milk jar, a milk jar for collecting milk from a milking, a milk tank for storing milk from a plurality of milkings, a milk line between the milk jar and the milk tank, a milk pump for pumping the milk from the milk jar to the milk tank at a milk pumping speed, a milk meter for determining the quantity of milk milked in the milking, and a control unit for controlling the robotic milking device, the sampling device comprising a sample line with an input connection to at least one of the milk jar, the milk pump and the milk line, and with an output to a sample collection receptacle, a control device controllable by the control unit on the basis of the quantity of milk determined by the milk meter in order to direct, during said pumping, a predetermined, in particular fixed, sample quantity of milk through the sample line.

The invention is based on the idea that it is not necessary to estimate the milk yield in advance provided that the milk is first collected before being directed to the milk tank. After all, it is then possible to measure the milk yield, such as with a milk meter. This prevents deviations, such as if the dairy animal is startled during the milking and retains the milk, with the result that the milk yield is (much) lower than expected. Other things may also influence the actual milk yield, which means there is always a level of uncertainty in the device according to the prior art. Measuring the milk yield removes this uncertainty, and the ratio between the desired sample quantity and the milk yield may be determined in a clear and reliable manner. On the basis thereof, the control device may subsequently discharge this quantity from the milk flow. It should be noted that this quantity does not always have to be the same, but, if required, may be set in advance by the user, such as in dependence on the capacity of the sample bottle, etc. It is expressly noted here that this differs from the filling of a sample bottle with an oversized sample of milk, in which case an excess will flow out. After all, it may thus still not be possible to ensure a proportional sample, because it will not be clear which portion of the milk is not represented in the sample as a result of that flowing-out process.

Here, the milking device may be a conventional milking device, wherein milking cups are manually attached to teats. However, the milking device is advantageously a robotic milking device which can milk the dairy animal in a completely autonomous manner. In the case of such milking devices, a milk jar, in which the milk from the milking is collected before being pumped to the milk tank, is virtually commonplace, such that therein optimal use may be made of the information obtainable thereby about the milk yield. After the milking has ended, and, if required, after the milk in the milk jar has been assessed, this milk yield is pumped away by means of a milk pump, at a milk pumping speed. Said milk pumping speed may be substantially constant, or variable in the alternative.

Particular embodiments are described in the attached subclaims, and in the following part of the description.

In particular, the milk meter comprises a milk flow meter for measuring the magnitude of a milk flow of milk to the milk jar. This is virtually always already provided in a milking device anyway, in order to determine the milk yield, but often also to control the milking. For example, the milking is often considered to have started correctly if a milk flow is detected sufficiently swiftly, and the milking is ended when the milk flow falls below a particular magnitude. Integrating for example the milk flow values (in l/minute or kg/minute) with respect to time produces the value for the quantity of milk.

More particularly, the milk meter comprises a quantity meter, such as a weight meter, configured to determine the quantity of milk in the milk jar. The milk flow is then determined exactly by determining the time derivative of the volume. However, it is more important that this makes it possible to determine the quantity of milk milked directly, and thus often more accurately. Such a quantity meter, specifically a weight or mass meter, is also much less susceptible to the amount of foam in the flow of milk, because the weight of this air does not contribute to the weight value.

In embodiments, the control device comprises a sample pump configured to pump said sample quantity through the sample line. Although it is also possible for the sample quantity to be allowed to flow passively through, for example, an opening, by the pressure of the milk or by gravity, better control is afforded if this happens under the influence of, and controlled with the aid of, a sample pump. However, it is also possible for the control device to be equipped with a controllable valve or other opening, the opening of which is controlled by the control unit on the basis of the desired throughput. It is thus also possible for the required fraction of milk for the sample quantity to be separated off.

In embodiments, the sample pump has a sample pumping speed which is settable, or controllable, by the control unit on the basis of the determined quantity of milk. In particular, the sample pumping speed is also settable, or adjustable, on the basis of said milk pumping speed. The control unit is for example configured to calculate how long the pumping of the obtained milk with the milk pump will last. On the basis thereof, the control unit may calculate how rapidly the sample pump has to rotate in order to pump the desired sample quantity of milk out of the milk flow, to a sample bottle, in the same time. In this case, the sample pump thus rotates just as long as the milk pump, and may take a representative milk sample in this way. If the milk pump does not always have the same flow rate during pumping of the milk, for example due to the fact that the hydrostatic pressure has an influence thereon, then the control unit may also adjust the sample pumping speed as a function of time, or directly proportionally to the flow rate of the milk pump if the flow rate of the milk pump is measured during pumping of the milk, such as by means of a milk flow meter in the milk line.

In embodiments, the control device is configured to take a predetermined number of partial samples of the milk during the pumping by the milk pump, wherein the partial samples together yield the sample quantity. In particular, the partial samples are of equal size. Instead of constantly separating off a (very) small portion of the milk flow, it is also possible to sufficiently frequently take a partial sample in order to obtain a representative milk sample. The instantaneous flow of the partial sample will then be proportionally greater than the flow if a small fraction is constantly separated off. And such a greater flow, which then does not flow the entire time, is often easier to monitor and control than a smaller one. For example, it experiences less resistance than a small flow, and can be controlled more accurately.

In exemplary embodiments, the control device comprises a valve which is controllable by the control unit, wherein the control unit is configured to keep the valve open when a partial sample is being taken. By only opening the valve in each case to take a partial sample, a partial sample is each time passed through the sample line to a sample bottle or at least an output therefor.

Alternatively or in addition, the control device comprises a sampling pump configured to intermittently take the partial samples. As has already been described above for the continuously operating sample pump, the latter may also be intermittently used to take partial samples. In this case, the sample pump may be activated intermittently, or the sample pump may, in principle, constantly be in operation, with a valve also being provided which is opened by the control unit only when a partial sample is being taken. This latter option has the advantage that there will be less of a delay because a valve will react more rapidly than a pump, and the wear will often also be lower than in the case of a constantly starting and stopping pump. In the first-mentioned case, the pump itself functions more or less as an intermittent valve, by shutting off the sample line.

Although not necessary, the time intervals between successive partial samples are substantially the same in embodiments. With simple control of the control device, this nevertheless provides an effective device for taking a sufficiently representative milk sample.

In embodiments, the control device is configured to in each case take a partial sample when a predetermined partial quantity of milk is being or has been pumped by the milk pump. In particular, said partial quantity is in particular equal to the quantity of milk milked divided by the number of partial samples to be taken. In this case, a partial sample is thus not taken on the basis of a time interval, but on the basis of the liters/kilograms of milk pumped. Particularly if it is not possible to guarantee that the flow rate during pumping of the milk is substantially constant, these embodiments may afford advantages, though the control is somewhat more complex since the control unit is then configured to measure the quantity of milk pumped and to control the control device to take a partial sample during or after said partial quantity of milk pumped.

Said number of partial samples is advantageously, but not exclusively, between 5 and 50, in particular between 5 and 20. By taking partial samples at, for example, between 5 and 50 instants and thereby compiling the milk sample, it is possible to make the milk sample representative in a reliable manner. It will be clear that a higher number of partial samples makes it possible to sample the milk at a greater variety of instants, but the control unit may become more complex and possibly more susceptible. In practice, it is possible in a simple manner to find a number of partial samples that satisfies the requirements to be imposed.

In a second aspect, the invention provides a milking system comprising a milking device, comprising milking means, a milk jar for collecting milk from a milking, a milk tank for storing milk from a plurality of milkings, a milk line between the milk jar and the milk tank, a milk pump for pumping the milk from the milk jar to the milk tank, a milk meter for determining the quantity of milk milked in the milking, and a control unit for controlling the milking device, and also a sampling device according to the first aspect of the invention configured to take a representative milk sample from the milking device. In this case, the milking device is thus provided with a sampling device according to the invention. The advantages have already been well described above, and so they are not mentioned again here for the sake of brevity. However, it will be clear that each of the embodiments of the sampling device in the milking device according to the invention will yield similar advantages.

In particular, the milking device is a robotic milking device, in which case it is advantageous for the sampling to also be carried out in an automated manner, due to the fact that the dairy animals will often visit the milking device at random times.

The invention will now be described in more detail on the basis of some nonlimiting exemplary embodiments and the drawing. In the drawing:

FIG. 1 shows a schematic view of a milking device 1 comprising a sampling device 10 according to the invention.

Figure 1:
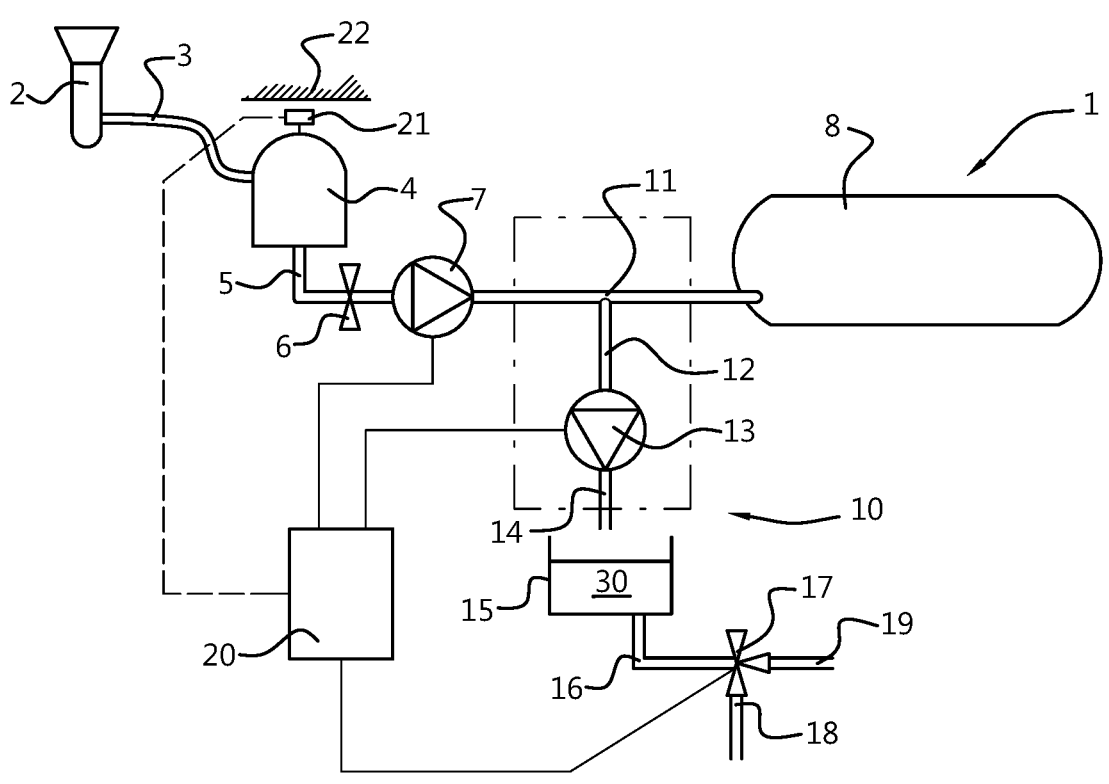
FIG. 1 shows a schematic view of a milking device comprising a sampling device according to the invention.

The milking device 1 comprises a milking cup 2, a milk hose 3, a milk jar 4, a milk line 5, a first valve device 6, a milk pump 7 and a milk tank 8.

The sampling device 10 comprises a connection point 11, a milk sample line 12, a sample pump 13, a sample output 14, a sample collection receptacle 15 for a milk sample 30, a sample discharge line 16, a second valve device 17, a sewage line 18 and a sample supply line 19.

20 indicates a control unit, 21 indicates a weight meter and 22 indicates the outside world, such as a milking box or stall wall.

In this case, for the sake of clarity, the milking device 1 has only one milking cup 2 shown, but in practice will usually have four or a different number of milking cups 2 that is adapted to the dairy animal, such as two for goats. As is customary, the milking cups 2 are placed onto the teats of a dairy animal (not shown here) in order to milk milk from it. The placement may be carried out manually, such as in conventional milking devices, or in a fully automated manner by means of a milking robot.

The milk hose 3 feeds the milk milked to a milk jar 4, in which the milk from a milking is collected. After the milking has concluded, the milk milked is pumped away via the milk line 5, and after the first valve device 6 has been opened, by means of the milk pump 7 to the milk tank 8 for bulk storage. The milking device 1 is also under the control of a control unit 20. In this case, it is furthermore assumed that this control unit also controls the sampling device 10, but it may also have a separate control unit. Details of such milking devices 1 are well known in the prior art.

The sampling device 10 comprises, on the milk line 5, a connection point 11 for a milk sample line 12 via which a portion of the milk flowing through the milk line 5 may be intercepted as milk sample, which may also be examined, such as in a laboratory or in a further sample analysis device provided (not shown here). With regard to this latter case, a sample pump 13 pumps a small amount of milk at set times to the sample collection receptacle, or sample bottle 15, via the sample output 14. The milk sample 30 collected in said sample bottle may subsequently be directed via the sample discharge line 16 by means of via the second valve device 17 to either a sewage line 18 or a sample supply line 19. If the milk sample 30 is collected in order to be sent to a laboratory, the sample discharge line 16, the second valve device 17 and the sewage and sample supply lines 18 and 19 may of course be omitted. It is pointed out here that the sample output 14 is a certain distance from the sample collection receptacle 15, such that the requirement to provide a reliable separation between the milk-carrying portion and the sample portion is met in a simple manner. Moreover, the connection point 11 may also be provided on the milk jar 4 or directly on the milk pump 7, that is to say the housing thereof, or between the valve 6 and the milk pump 7 or even between the milk jar 4 and the valve 6, which may have the advantage of a better laminar flow of the milk. In the present case, it will have to be ensured, for example by means of the selection of the sample pump 13 or by means of an additional valve, that milk is not already flowing through the milk sample line 12 during the milking.

According to the invention, in order to provide a representative milk sample, the control unit 20 controls the sampling device 10 as follows, for example. During the milking, the milk is collected in the milk jar 4. With the aid of the weight meter 21, such as one or more strain gauges or the like, the weight of the milk jar is continuously determined. The collected milk ensures a difference in weight, and the passage of time is an indication of the milk flow during milking. The total weight G of the collected milk, that is to say (weight after−weight before), is important for the invention.

A representative sample has to be taken from this weight G, taking account of for example vertical segregation of milk constituents in the milk jar 4. The sample 30 collected in the sample bottle 15 has a predetermined size of for example 30 ml. It is of course possible for the size to have been or be adapted to the size of the sample bottle 15, or otherwise to the desires of the user, but the size is fixed before the sampling begins.

For example, the control unit subsequently calculates the ratio between the milk yield G and the sample volume of 30 ml. If G is 12 liters, then the ratio is G:sample=12:0.030, that is to say approximately 400:1. It is thus necessary for 1 ml to be intercepted as partial sample from every 400 ml of milk. To this end, it is for example possible for the control unit 20 to take a fixed number of partial samples, such as 10 partial samples, by making the sample pump 13 pump 3 ml away through the milk sample line 10 times. The sample pump 13 is, for example, a metering pump such as a hose pump which can pump a fixed quantity of milk each time it is activated. In this case, the product of this fixed quantity multiplied by the number of activation instants is equal to the size of the milk sample to be collected, in this case 30 ml, but other volumes are of course possible. Thus, in the case of a virtually arbitrary size of G, the sample pump 13 can pump off 3 ml at each of these 10 times, up to a total of 30 ml.

The sample pump should preferably be activated by the control unit 20 at instants that are distributed over the pumping of the milk by the milk pump 7. If the pumping of the aforementioned 12 liters lasts 32 seconds, then the control unit 20 should make the sample pump 13 take a partial sample of 3 ml on average every 3.2 seconds. This may also be at the end of a period of 3.2 seconds, or at any other fixed instant during the period, such as in the middle. The latter prevents there being any inaccuracy due to start-up or shut-off during the pumping of the milk. Said figures are of course only examples, and may be easily adapted for other values.

In the aforementioned example, it is assumed that the milk pump 13 pumps the milk at a constant flow rate. This assumption is by no means necessary. Alternatively, the control unit 20 may for example be configured to actuate the sample pump 13 on the basis of the quantity of milk pumped. To this end, the control unit 20 constantly obtains the weight of the milk that is present via the weight meter 22, and may thus keep track of how much milk has been pumped by the milk pump 13. Again, the control unit divides the quantity of milk G to be pumped into a desired number of partial samples, in this example 12 liters and, respectively, 10 partial samples. This means that the control unit has to take one partial sample, by way of the sample pump 13, per 1.2 litres of milk pumped. Here, too, the control unit may be configured to take that partial sample at the beginning or end or for example in the middle of that quantity of 1.2 liters.

Figure 2:
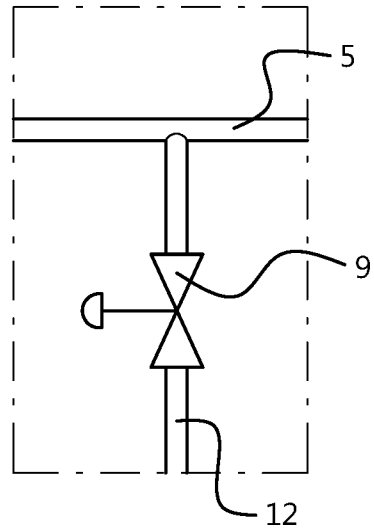
FIG. 2 shows a schematic view of a detail of an alternative sampling device according to the invention.

FIG. 2 shows a schematic view of a detail of an alternative sampling device according to the invention. This portion is intended to replace that portion of FIG. 1 which is also surrounded by a dot-dashed line. Similar components are indicated by the same reference numerals.

In this alternative, a milk sample line 12 again intercepts the milk line 5, but via a controllable valve or restriction 9 instead of via a sample pump. In the example with G=12 liters and a milk sample volume of 30 ml, the control unit 20 has to adjust the controllable valve 9 in such a way that the latter allows through 0.030/12=¹⁄₄₀₀th of the milk flow, at least if the valve 9 is open continuously. It is also possible for the valve 9 to allow through a greater portion of the milk flow, such as ⅟₁₀₀th. This is four times as much as in the continuously open position, and thus the control unit 20 then has to open the valve 9 for ¼ of the time, such as 1 s per 4 s. This opening is also preferably effected spread over the pumping-off time. Here, too, the control unit 20 may choose to open the valve 9 not every four seconds but for example in each case after 10% of G has been pumped. This percentage is of course dependent on the desired number of partial samples, a greater number providing better proportionality, at the cost of the complexity of the control unit.

The invention claimed is:

1. A sampling device for taking a representative milk sample from a milking device, the milking device comprising:

a milking means, a milk jar for collecting milk from a milking, a milk hose between the milking means and the milk jar, a milk tank for storing milk from a plurality of milkings, a milk line between the milk jar and the milk tank, a milk pump for pumping the milk from the milk jar to the milk tank at a milk pumping speed, a milk meter for determining a yield of milk milked in the milking, and a control unit for controlling a robotic milking device; and the sampling device comprising:

a sample line with an input connection to at least one of the milk jar, the milk pump and the milk line, and with an output to a sample collection receptacle, and a control device controllable by the control unit on the basis of the yield of milk determined by the milk meter in order to direct, during said pumping, a predetermined sample quantity of milk through the sample line.

2. The sampling device according to claim 1, wherein the milk meter comprises a milk flow meter for measuring a magnitude of a milk flow of milk to the milk jar, and wherein the milk meter comprises a quantity meter being a weight meter configured to determine the quantity of milk in the milk jar.

3. The sampling device according to claim 1, wherein the milk meter comprises a milk flow meter for measuring a magnitude of a milk flow of milk to the milk jar.

4. The sampling device according to claim 1, wherein the control device comprises a sample pump configured to pump said predetermined sample quantity through the sample line.

5. The sampling device according to claim 4, wherein the control device is configured to take a predetermined number of equal-sized partial samples of the milk during the pumping by the milk pump, wherein the partial samples together yield the predetermined sample quantity.

6. The sampling device as claimed in claim 4, wherein the sample pump has a sample pumping speed which is adjustable by the control unit on the basis of the yield of milk determined by the milk meter.

7. The sampling device based on claim 6, wherein the sample pumping speed is also adjustable on the basis of said milk pumping speed.

8. The sampling device according to claim 4, wherein the control device is configured to take a predetermined number of partial samples of the milk during the pumping by the milk pump, wherein the partial samples together yield the predetermined sample quantity.

9. The sampling device according to claim 8, wherein time intervals between successive partial samples are substantially the same.

10. The sampling device according to claim 8, wherein the control device is configured to in each case take a partial sample when a predetermined partial quantity of milk is being or has been pumped by the milk pump, wherein said predetermined partial quantity is equal to the quantity of milk milked divided by a number of partial samples to be taken.

11. The sampling device according to claim 8, wherein said predetermined number of partial samples is between 5 and 50.

12. The sampling device according to claim 8, wherein said predetermined number of partial samples is between 5 and 20.

13. The sampling device as claimed in claim 8, wherein the control device comprises a valve which is controllable by the control unit, wherein the control unit is configured to keep the valve open when a partial sample is being taken.

14. The sampling device according to claim 1, wherein the control device comprises a sampling pump configured to intermittently take partial samples.

15. The sampling device for taking a representative milk sample from a milking device according to claim 1, wherein the milking device is a robotic milking device.

16. The sampling device according to claim 1, wherein the control device controllable by the control unit on the basis of the yield of milk determined by the milk meter in order to direct, during said pumping, a fixed sample quantity of milk through the sample line.

17. A milking system comprising the milking device comprising the milking means, the milk jar for collecting milk from the milking, the milk tank for storing milk from the plurality of milkings, the milk line between the milk jar and the milk tank, the milk pump for pumping the milk from the milk jar to the milk tank, the milk meter for determining the yield of milk milked in the milking, and the control unit for controlling the milking device, and also the sampling device according to claim 1, configured to take a representative milk sample from the milking device.

18. The milking system according to claim 17, wherein the milking device is a robotic milking device.

19. The sampling device according to claim 1, wherein the milk meter comprises a milk flow meter for measuring a magnitude of a milk flow of milk to the milk jar, and wherein the milk meter comprises a quantity meter configured to determine the quantity of milk in the milk jar.

\* \* \* \* \*